(12) United States Patent
Arazaki (10) Patent No.: US 10,242,424 B2
(45) Date of Patent: Mar. 26, 2019

(54) IMAGE PROCESSING DEVICE AND METHOD FOR CONTROLLING MULTIPLE PROCESSORS TO PROCESS IMAGE DATA

(71) Applicant: SEIKO EPSON CORPORATION, Tokyo (JP)

(72) Inventor: Shinichi Arazaki, Fujimi-machi (JP)

(73) Assignee: Seiko Epson Corporation, Tokyo (JP)

(*) Notice: Subject to any disclaimer, the term of this patent is extended or adjusted under 35 U.S.C. 154(b) by 10 days.

(21) Appl. No.: 15/797,338

(22) Filed: Oct. 30, 2017

(65) Prior Publication Data
US 2018/0122040 A1    May 3, 2018

(30) Foreign Application Priority Data

Oct. 31, 2016  (JP) .................. 2016-212902

(51) Int. Cl.
*G06F 3/12* (2006.01)
*G06T 1/20* (2006.01)
*G06K 15/02* (2006.01)

(52) U.S. Cl.
CPC ............... *G06T 1/20* (2013.01); *G06F 3/124* (2013.01); *G06F 3/1211* (2013.01); *G06F 3/1288* (2013.01); *G06K 15/1856* (2013.01); *G06F 3/1224* (2013.01); *G06F 3/1247* (2013.01); *G06F 3/1277* (2013.01); *G06T 2200/28* (2013.01); *G06T 2210/52* (2013.01)

(58) Field of Classification Search
CPC .......... G06T 1/20; G06F 3/1211; G06F 3/124; G06K 15/186
See application file for complete search history.

(56) References Cited

U.S. PATENT DOCUMENTS

| 2002/0041396 | A1* | 4/2002 | Ugajin | G11B 20/1883 358/1.17 |
| 2002/0060801 | A1* | 5/2002 | Motamed | G06K 15/1857 358/1.13 |
| 2004/0196496 | A1* | 10/2004 | Klassen | G06F 3/1212 358/1.15 |
| 2004/0197124 | A1* | 10/2004 | Klassen | G06F 3/1211 400/70 |
| 2005/0146742 | A1* | 7/2005 | Gregory | G06F 3/1211 358/1.15 |
| 2006/0161761 | A1* | 7/2006 | Schwartz | G06F 21/52 711/216 |

(Continued)

FOREIGN PATENT DOCUMENTS

| JP | 2011-095807 A | 5/2011 |
| JP | 5895444 B2 | 3/2016 |

(Continued)

*Primary Examiner* — Nicholas Pachol
(74) *Attorney, Agent, or Firm* — Foley & Lardner LLP (57) ABSTRACT

An image processing device including a plurality of processors that execute arithmetic processing on image data, an information retaining portion that retains information related to arithmetic processing speeds of the plurality of processors, and a control portion that, among the image data, designates partial data to be processed by the respective processors and causes the plurality of processors to execute arithmetic processing, in which the control portion determines partial data for causing the plurality of processors to process on the basis of the information.

11 Claims, 5 Drawing Sheets

(56) References Cited

U.S. PATENT DOCUMENTS

| | | | | |
|---|---|---|---|---|
| 2009/0161163 A1* | 6/2009 | Klassen | G06F 3/1213 | 358/1.18 |
| 2009/0225369 A1* | 9/2009 | Gordon | G06F 3/1212 | 358/1.18 |
| 2010/0073695 A1* | 3/2010 | Duggan | G06K 15/02 | 358/1.6 |
| 2010/0202008 A1* | 8/2010 | Aronshtam | G06K 15/02 | 358/1.15 |
| 2010/0277757 A1* | 11/2010 | Smith | G06F 3/1215 | 358/1.15 |
| 2011/0149347 A1* | 6/2011 | Sato | G06K 15/401 | 358/1.16 |
| 2011/0235098 A1* | 9/2011 | Mizuguchi | G06F 3/1211 | 358/1.15 |
| 2011/0255124 A1* | 10/2011 | Klassen | G06F 3/121 | 358/1.15 |
| 2011/0310413 A1* | 12/2011 | Nakao | G03G 15/5004 | 358/1.9 |
| 2012/0314240 A1* | 12/2012 | Randell | G06F 3/1213 | 358/1.14 |
| 2013/0010325 A1* | 1/2013 | Varga | G06K 15/1852 | 358/1.15 |
| 2013/0021623 A1* | 1/2013 | Ward | G06K 15/1857 | 358/1.9 |
| 2013/0128307 A1 | 5/2013 | Utsunomiya et al. | | |
| 2013/0135401 A1 | 5/2013 | Kobayashi et al. | | |
| 2013/0201494 A1* | 8/2013 | Sweet | G06F 3/1206 | 358/1.9 |
| 2013/0258358 A1* | 10/2013 | Qian | G06K 15/1813 | 358/1.8 |
| 2013/0258374 A1* | 10/2013 | Klassen | G06F 3/1211 | 358/1.13 |
| 2013/0258375 A1* | 10/2013 | Morgana | G06K 15/1822 | 358/1.13 |
| 2017/0124436 A1* | 5/2017 | Okano | G06K 15/1857 | |

FOREIGN PATENT DOCUMENTS

| | | |
|---|---|---|
| JP | 5899863 B2 | 4/2016 |
| JP | 5899869 B2 | 4/2016 |
| JP | 5906648 B2 | 4/2016 |

* cited by examiner

IMAGE PROCESSING DEVICE AND METHOD FOR CONTROLLING MULTIPLE PROCESSORS TO PROCESS IMAGE DATA

CROSS REFERENCE TO RELATED APPLICATIONS

This application claims priority to Japanese Appl. No. 2016-212902 filed Oct. 31, 2016, the disclosure of which is herein incorporated by reference in its entirety.

BACKGROUND

1. Technical Field

The present invention relates to an image processing device and an image processing method that process image data by using a plurality of processors.

2. Related Art

For example, in the manner of a case in which image data created by an appropriate image editing application is converted into data that can be processed by a printing apparatus, there are cases in which it is necessary to carry out data processing on image data that represents an image and create new image data. In such a case, there are often cases in which identical processes are applied to each pixel that constitutes the image. Since processing individual pixels in order leads to repeated processing of an enormous arithmetic amount, there are cases in which a dedicated processor is used in order to perform such a process with high efficiency.

For example, in a processor referred to as a Graphics Processing Unit (GPU), the performance of a large amount of data processing in a short time is made possible as a result of a plurality of arithmetic cores, which execute arithmetic processing, being provided and operating in parallel. Image processing devices configured to cause such a GPU to bear the above-mentioned image processing has already been put into practical use (for example, refer to JP-A-2011-095807).

An image processing device equipped with a plurality of GPUs has been proposed in order to further enhance the processing performance of the image processing device. In a case in which a single computer apparatus is equipped with a plurality of GPUs, the properties thereof are not necessarily identical. For example, in a current personal computer apparatus having a general configuration, a relatively small GPU is incorporated in the apparatus main body. Further, it is possible to further improve arithmetic processing performance by mounting a card type module, for example, equipped with a GPU in an expansion slot according to necessity. It is also possible to conceive of two or more modules being mounted in an apparatus. In this case, there are cases in which the plurality of GPUs are not the same.

If a plurality of processors all have identical properties, it is possible to use each processor without distinguishing between each processor. Meanwhile, in a case in which there is a difference in the arithmetic performance thereof, the time required for processing differs depending on the amount of image data each processor is caused to process. However, a specific method for choosing how to operate each processor in such a case has not been established.

SUMMARY

An advantage of some aspects of the invention is that it is possible to suitably operate a processor in accordance with a required processing content in an image processing device and an image processing method that have a configuration for solving at least a portion of the above-mentioned problems, and process image data by using a plurality of processors.

According to an aspect of the present invention, there is provided an image processing device including a plurality of processors that respectively execute arithmetic processing on image data, an information retaining portion that retains information related to arithmetic processing speeds of the plurality of processors, and a control portion that, among the image data, designates partial data to be processed by the respective processors and causes the plurality of processors to execute arithmetic processing, in which the control portion determines the partial data for causing the plurality of processors to process on the basis of the information.

In addition, according to another aspect of the present invention, there is provided an image processing method that processes image data by using a plurality of processors, the method including when information related to arithmetic processing speeds of the plurality of processors is calculated in advance, causing a control portion to determine, among the image data, partial data for causing the plurality of processors to process on the basis of the information, causing the control portion to transmit the partial data that corresponds to the plurality of processors to the processors, and causing the plurality of processors to execute arithmetic processing based on the partial data received.

In such a configuration, the arithmetic processing speeds of the plurality of processors is established in advance. Further, among the image data, the partial data to be processed by the processors is determined on the basis of information that represents arithmetic processing speeds. Therefore, it is possible to optimize the allocation of image data to the processors in accordance with the processing performances thereof. As a result of this, it is possible to suitably activate the plurality of processors in accordance with a required amount of processing.

In the device, for example, the control portion may be configured so as to cause a larger processing amount of partial data to be processed by a processor having higher arithmetic processing speed. In this manner, by processing a large amount of image data by using a processor having high processing performance, for example, it is possible to avoid a circumstance in which processing is limited by a processor having slow processing speed and the overall processing time is increased, and to use the plurality of processors with high efficiency as a whole.

In addition, in the device, in a case in which image data corresponding to images of a plurality of pages is processed, for example, the control portion may be configured so as to cause the processors to process partial data divided into page units. In particular, in a case in which a processor processes image data in parallel by using multiple arithmetic units, processing as a result of the processor collectively acquiring a large amount of image data is an advantage in that arithmetic resources are used efficiently. As a result of dividing an image into page units, it is possible to perform data division according to the characteristics of such a processor.

In the device, among the processors, the control portion may be configured so as to cause a processor having a highest arithmetic processing speed to process partial data that corresponds to a page to be output first among the plurality of pages. Since such a configuration can generate image data corresponding to a first page as quickly as possible, it is suitable in a case in which it is desirable to obtain the first output at an early stage.

In addition, for example, in a configuration of the device further including a buffer that accumulates processed image data, the control portion may be configured so as to cause the processors to process partial data in which image data that corresponds to a single image is divided when an amount of data accumulated in the buffer is less than a predetermined value. In such a configuration, since a single image is processed using arithmetic resources of a plurality of processors, it is possible to generate processed image data to be accumulated in the buffer at an early stage.

In this case, in the device, for example, the control portion may be configured so as to cause the processors to process partial data divided into page units when an amount of data inside the buffer exceeds the predetermined value. In a case in which a given amount of processed image data is accumulated inside the buffer, priority may be given to performing overall processing with high efficiency by generating subsequent image data immediately. In such a case, it is possible to use arithmetic resources efficiently and perform overall processing of image data with high efficiency by dividing the image data into page units.

In addition, for example, in the device, the information retaining portion may be configured to retain information based on a result of the processors processing predetermined standard image data in advance. As a result of the arithmetic processing speeds of each processor being represented by a result of the plurality of processors mutually processing the same predetermined standard image data in a state of being installed in an image processing device, it is possible to perform division of image data according to the relative difference in arithmetic processing speeds of the processors.

In addition, for example, in the device, at least one of the processors may be provided in an expansion unit that is attachable and detachable to and from a computer apparatus of the control portion. It is also possible for various types of processor to be provided in the expansion unit, and for a plurality of types of processor to be installed in a single image processing device. In such cases, since there is naturally a difference in the arithmetic processing speeds of the processors, the division of image data according to arithmetic processing speed such as that mentioned above is particularly effective.

In this case, in the device, the control portion may be configured so as to rewrite the information that the information retaining portion retains in accordance with a mounting state of the expansion unit. As a result of configuring in such a manner, the division of image data in a state according to respective arithmetic processing speeds is also possible in a case in which a combination of processors installed in an image processing device is changed.

In addition, the device may further include a printing section that performs printing on the basis of the image data processed by the plurality of processors. According to such a configuration, since image data provided to printing is output with high efficiency by a plurality of processors, a short first print is possible. In addition, it is possible to avoid an interruption to printing caused by data processing during continuous printing.

In addition, according to still another aspect of the present invention, there is provided a control program that causes a control portion of a computer apparatus provided with a plurality of processors that process image data, to execute calculating information related to arithmetic processing speeds of the plurality of processors, determining, among the image data, partial data for causing the plurality of processors to process on the basis of the information, and transmitting the partial data that corresponds to the plurality of processors to the processors.

As a result of causing the execution of the above-mentioned control program by a control portion of a computer apparatus either provided with a plurality of processors that process image data in advance, or configured to have a plurality of processors by adding processors in a form such as an expansion unit, it is possible to cause the computer apparatus to execute the invention. That is, it is possible to optimize the allocation of image data to each processor in accordance with processing performance and to suitably operate the plurality of processors in accordance with required processing.

Additionally, not all of the plurality of constituent elements in each of the above-mentioned aspects of the invention are essential, and a portion of the plurality of constituent elements may be altered, omitted, replaced with other new constituent elements, or a portion of the limiting content thereof may be omitted as appropriate in order to solve a portion or all of the above-mentioned problems or in order to achieve a portion of or all of the effects set forth in the present specification. In addition, a portion of or all of the technical features included in one of the above-mentioned aspects of the invention may be combined with a portion of or all of the technical features included in other aspects of the invention, or may be configured as independent aspects of the invention in order to solve a portion or all of the above-mentioned problems or in order to achieve a portion of or all of the effects disclosed in the present specification.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
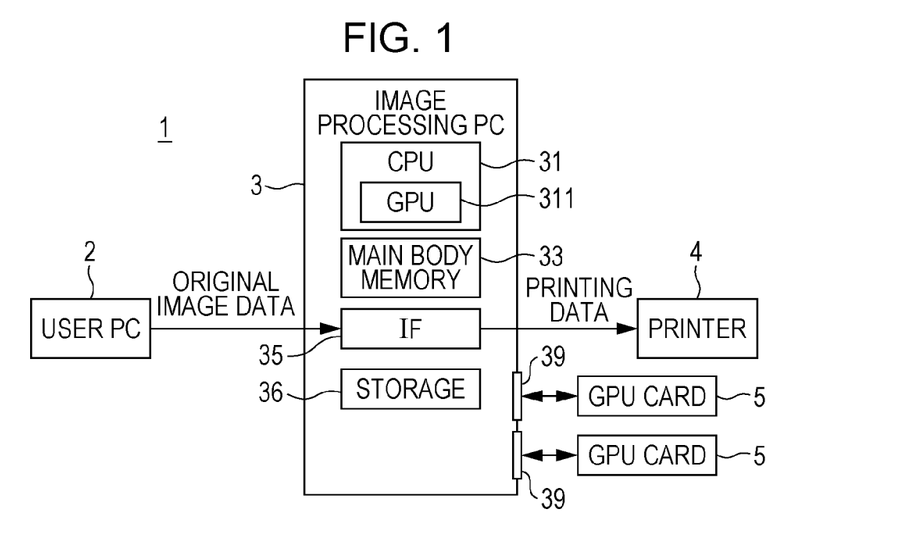
FIG. 1 is a block diagram that shows a configuration example of a printing process system to which the invention can be applied.

FIG. 1 is a block diagram that shows a configuration example of a printing process system to which the invention can be applied. A printing process system 1 includes a user personal computer (hereinafter abbreviated to a "user PC") 2, an image processing personal computer (hereinafter abbreviated to an "image processing PC") 3, and a printer 4, and the components are connected in a communicable manner. The printing process system 1 is a system in which a user operates the printer 4, and prints a desired image.

More specifically, a user that wishes to print creates original image data that represents an image for which printing is desired using an appropriate image editing application executed by the user PC 2. The original image data is sent to the image processing PC 3. As a result of an image processing application installed on the image processing PC 3 being executed, the original image data is converted into printing data that the printer 4 is capable of printing. As a result of the printing data being transmitted to the printer 4 from the image processing PC 3, and the printer 4 executing a printing job corresponding to the printing data, an image corresponding to the original image data is printed.

The user PC 2 is a computer apparatus having a hardware configuration that is equivalent to that of an ordinary personal computer or workstation. The image processing PC 3 also has a similar hardware configuration. An example of a specific configuration is being provided with a central processing unit (CPU) 31, a main body memory 33, and an interface (IF) 35. The CPU 31 manages the overall operation of the image processing PC 3 by executing a predetermined control program. The interface 35 performs communication with external devices, and for example, assumes a role of receiving the original image data from the user PC 2 and transmitting the printing data to the printer 4. The CPU 31 may be provided with a Graphics Processing Unit (GPU) 311, which, among the processes that the CPU 31 executes, assumes a role of image processing, in a package or as a chipset.

In addition, the main body memory 33 stores and saves data generated as a result of the CPU 31 executing various programs. The main body memory 33 is equivalent to memory mounted in an ordinary personal computer as main memory, but in this instance, is referred to as "main body memory" in order to discriminate from the memory on a GPU card 5, which will be mentioned later. As will be mentioned later, a portion of a storage region of the main body memory 33 is used as a buffer 331 (FIG. 2) that temporarily accumulates image data provided from the user PC 2 and ultimately sent to the printer 4. Dedicated hardware that functions as a buffer may also be provided.

In addition, the image processing PC 3 is provided with a storage 36 that stores a control program to be executed by the CPU 31, processing parameters required in the execution thereof, and the like. The storage 36 is a nonvolatile storage device, and for example, can be configured by a hard disk drive (HDD), a solid-state drive (SSD), or the like. The access speed from the CPU 31 of the storage 36 is slower than that of the main body memory 33, but the storage 36 has a high capacity, and can store and save a large amount of data for an extended period of time.

At least one (two in this example) GPU card 5 is mounted in expansion slots 39 provided in the image processing PC 3. As will be described below, the GPU card 5 has a hardware configuration that is suitable for image data processing, and has a function of creating printing data in a short period of time as a result of processing arithmetic for each pixel in parallel when creating the printing data from the original image data in accordance with control orders from the CPU 31.

Figure 2:
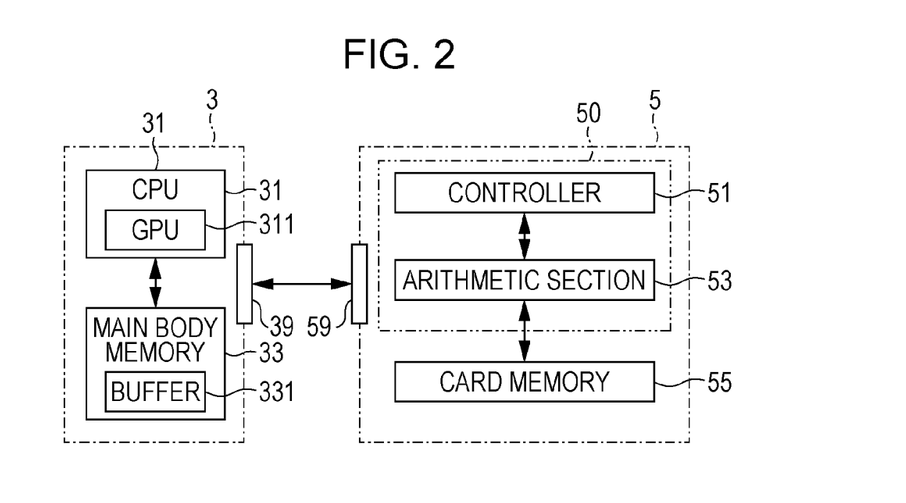
FIG. 2 is a view that shows the main components of an image processing PC and a GPU card.

FIG. 2 is a view that shows the main components of an image processing PC and a GPU card. The GPU card 5 is a card-type module that has a connector 59 that can be mounted in the expansion slots 39 of the image processing PC 3, and expands the functions of the image processing PC 3 as a result of being mounted therein. Additionally, in this manner, each configuration in the GPU card 5 to be described below is installed in the image processing PC 3 in an attachable and detachable manner, but may be built into the image processing PC 3 in advance. In addition, the format of a module that includes the GPU 50 is arbitrary and is not limited to a card-type such as that mentioned above.

The GPU card 5 is provided with a GPU 50, which is a processor having a hardware configuration that performs parallel processing of image processing, and a memory 55 for storing image data that the GPU 50 processes. Hereinafter, the memory 55 will be referred to as "card memory" in order to discriminate from the main body memory 33 provided in the image processing PC 3. A plurality of GPUs 50 may be provided in a single GPU card 5. The GPU 50 and the card memory 55 are directly coupled, and direct access of the card memory 55 from the GPU 50 is possible.

The GPU 50 is provided with a controller 51 that is connected to the CPU 31 in a communicable manner via the connector 59, and an arithmetic section 53 that executes arithmetic processing by using instructions from the controller 51. The controller 51 controls the operations of each portion inside the GPU card 5 on the basis of a control program and various processing parameters received from the CPU 31. The arithmetic section 53 is provided with a common arithmetic algorithm provided from the controller 51, and multiple arithmetic cores (not illustrated in the drawings) that execute arithmetic processing based on different datasets read from the card memory 55 in a parallel manner. An arithmetic result of the arithmetic section 53 is written to the card memory 55.

For example, there are productized GPUs that include anywhere from hundreds to thousands of arithmetic cores in a single arithmetic section 53. Each arithmetic core has a hardware configuration that corresponds to executing comparatively simple arithmetic at high speed. In this manner, the GPU card 5 has a configuration that is suited to executing arithmetic, which is a repetition of an identical process but for which the amount of arithmetic is enormous, at high speed by using parallel processing due to multiple arithmetic cores. Such a configuration is particularly suitable for processing image data for which it is desirable to execute an identical process for all pixels.

A GPU 311 that is built into the CPU 31 also has a similar hardware configuration and processing function. Generally, there are many cases in which the hardware of the GPU 311 is small in comparison with that of the GPU 50, which is configuration as a dedicated chip, and there are often cases in which the arithmetic processing performance thereof is limited. Therefore, in the embodiment, for example, there are often cases in which the GPU 311 is mainly used in order to process an image to be displayed on a display portion, which is not illustrated in the drawings, of the image processing PC 3. However, the GPU may bear a portion of the image data processing which will be mentioned later, according to necessity.

Figure 3:
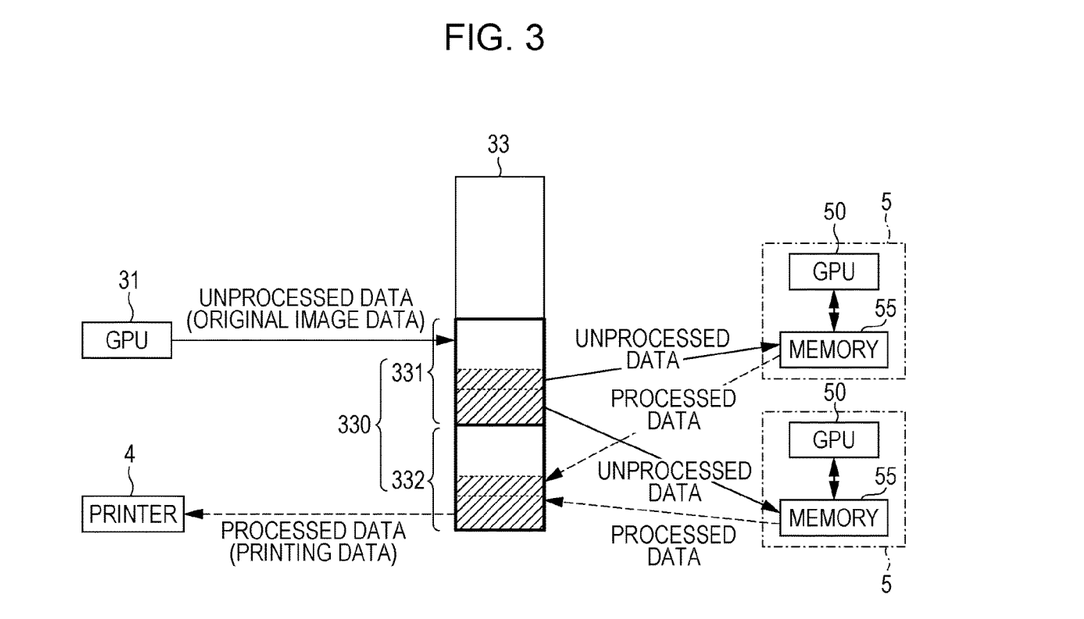
FIG. 3 is a view that schematically shows a flow of image data in the printing process system.

FIG. 3 is a view that schematically shows a flow of image data in the printing process system. When original image data representing an image to be a printing subject is provided from the user PC 2, the CPU 31 of the image processing PC 3 writes the original image data to an unprocessed data region 331 among a buffer region 330 provided in the main body memory 33 in advance. The provided original image data prior to a conversion process into printing data, and hereinafter, will be referred to as "unprocessed data". In FIG. 3, the solid line arrows represent the flow of unprocessed data.

Unprocessed data accumulated in the unprocessed data region is transferred to the card memory 55 of the GPU card 5 at an appropriate timing. The GPU 50 on the GPU card 5 executes predetermined image processing on the unprocessed data saved on the card memory 55 provided in the GPU card 5. More specifically, arithmetic section 53 of the GPU 50 executes arithmetic processing based on an algorithm designated from the CPU 31 via the controller 51 and unprocessed data saved in the card memory 55. Hereinafter, image data generated by the arithmetic processing will be referred to as "processed data". Processed data in this case is image data provided in a printing process of the printer 4, that is, printing data.

The processed data that the multiple arithmetic cores provided in the arithmetic section 53 generate by using arithmetic processing is temporarily saved in the card memory 55. When processing of all of the unprocessed data saved in the card memory 55 is completed, the unprocessed data is transferred to a processed data region 332 of the buffer region 330 that is set in the main body memory 33. In FIG. 3, the dashed line arrows represent the flow of processed data. When processing by the GPU 50 is finished, the GPU 50 may write the processed data to the main body memory 33 from the card memory 55. In addition, the GPU 50 may notify the CPU 31 of the image processing PC 3 of the fact that the processing is finished, and the CPU 31 of the image processing PC 3 that receives notification may write the processed data to the main body memory 33 from the card memory 55.

The unprocessed data in the buffer is processed by a plurality of GPUs 50. More specifically, the unprocessed data accumulated in the unprocessed data region 331 of the buffer 330 is divided into a plurality of blocks, and the unprocessed data is respectively transferred to different GPU cards 5 for each block and is processed by the GPUs 50. Although illustration is omitted from the drawings, the same applies to a case in which the GPU 311 built into the CPU 31 is provided in image data processing. That is, a portion of the image data accumulated in the unprocessed data region 331 of the buffer 330 is sent to the GPU 311 and processed, and the processed image data is transferred to the processed data region 332 of the buffer 330.

Processed data generated by each GPU is accumulated in the processed data region 332 of the buffer 330. When printing preparation is complete, the printer 4 acquires processed data accumulated in the processed data region 332 of the buffer 330, and executes a printing job using the processed data as printing data.

In this manner, in the printing process system 1, the unprocessed data accumulated in the buffer 330 is divided into partial data of a plurality of blocks that correspond to a plurality of GPUs, the partial data is respectively sent to different GPUs and is processed in parallel by the GPUs. Processed data generated as a result of the respective GPUs processing partial data is assimilated in the buffer 330.

Unprocessed data accumulated in the unprocessed data region 331 of the buffer 330 is deleted from the buffer 330 when transferred to the GPU cards 5. Accordingly, among data provided from the user PC 2 as original image data for printing, only data for which processing by the GPUs 50 has not been completed is accumulated in the unprocessed data region 331. In addition, processed data accumulated in the processed data region 332 of the buffer 330 is deleted from the buffer 330 when transferred to the printer 4. Accordingly, among processed data that is processed by the GPUs 50, only processed data that has not yet been transferred to the printer 4 is accumulated in the processed data region 332.

In the image processing PC 3 having a plurality of GPUs in the above-mentioned manner, the arithmetic processing performances of the GPUs need not necessarily be the same. For example, in the above-mentioned manner, the arithmetic performance of the GPU 311 built into the image processing PC 3 is limited when compared with that of the GPUs 50 mounted in the GPU cards 5, which are configured as dedicated image processing modules. In addition, there are also cases in which the arithmetic processing performances of the plurality of GPU cards 5 differ as a result of a difference in the types and clock speeds of the mounted GPUs 50.

If the arithmetic processing performances of each GPU is identical, the image data to be processed may be equally divided in accordance with the number of the GPUs, and allocated to each GPU. Meanwhile, in a case in which the arithmetic processing performances of the GPUs differ, it is preferable that the allocated amounts of image data not be identical, and that the allocation of data processing be determined in accordance with the respective performances. The reason for this is that, for example, if a case in which image data corresponding to a single image is processed by a plurality of GPUs as a result of division into equal parts is considered, due to the difference in arithmetic processing performances, the overall processing speed is limited by a GPU having the slowest processing time.

In the manner to be described below, in the printing process system 1, the arithmetic processing performances of the plurality of GPUs 50 and 311 provided in the image processing PC 3 are evaluated in advance. Further, when image data is processed, the allocation of image data is determined in accordance with the arithmetic processing performances of each GPU 50 and 311.

Figure 4:
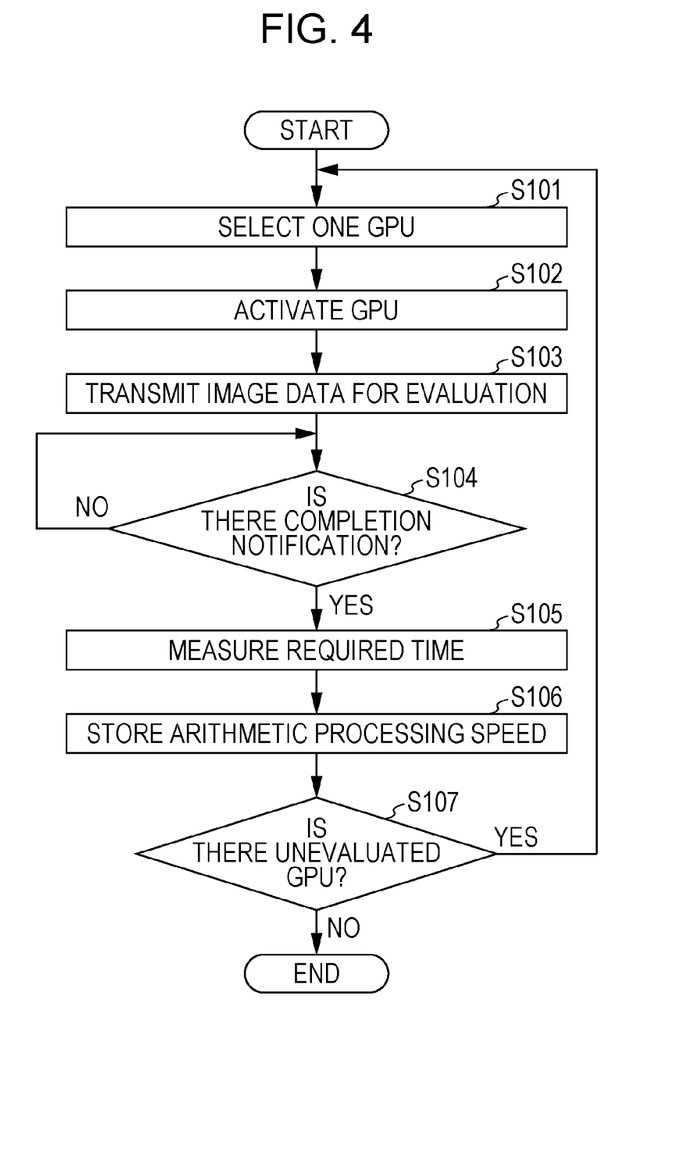
FIG. 4 is a flowchart that shows a process for evaluating the arithmetic processing performance of a GPU.

FIG. 4 is a flowchart that shows a process for evaluating the arithmetic processing performance of a GPU. The process is realized as a result of the CPU 31 executing a predetermined control program that is stored in the storage 36 in advance. For example, the process is executed when a new GPU card 5 is mounted in the image processing PC 3, when a GPU card 5 is replaced, or the like, or when it is recognized by the CPU 31 that there is a GPU for which evaluation has not been carried out. As a result of this, the information stored in the storage 36 is updated as required.

Firstly, a single GPU for which evaluation has not been carried out is selected (Step S101). An activation instruction is sent to the selected GPU from the CPU 31 (Step S102), and image data for evaluation is transmitted to the GPU (Step S103). The image data for evaluation is image data that corresponds to an image having appropriate image content. It is preferable that the image data for evaluation include various image content such as text, graphics, and photographic images. In addition, a plurality of types of image data corresponding to images having mutually different image content may be used as image data for evaluation.

The CPU 31 measures the required time until a notification of processing completion is received from a GPU to which the image data for evaluation is provided (Steps S104, S105). Judging from the result thereof, the arithmetic processing performance, or more specifically, the processing speed of the image data for evaluation of the GPU is calculated. Information related to the calculated processing speed of each GPU is stored in the storage 36 (Step S106). In a case in which there is another unevaluated GPU, the process returns to Step S101 (Step s107), and a similar process to that above is performed for the GPU. The process is completed once evaluation has been carried out for all of the GPUs. As a result of causing identical image data for evaluation to be processed, it is possible to relatively evaluate the processing speed of each GPU in a state of being installed in the image processing PC 3.

In this manner, the respective processing speeds of the GPUs provided in the image processing PC 3 are calculated, and stored in the storage 36. In practical image data processing, as will be described next, the division of image data to be processed is performed in accordance with the processing speed of each GPU calculated in this manner. The object of this is to optimize the arithmetic processing of the GPUs so as to shorten the time taken to output all printed matter corresponding to provided image data as much as possible. In the following description, three GPUs; namely two GPUs 50 respectively provided in two GPU cards 5, and a GPU 311 provided in the image processing PC 3 in advance, are used in image data processing. In addition, the processing speed of each GPU is calculated in advance by the process shown in FIG. 4, and each GPU is referred to as a "GPU-A", a "GPU-B", and a "GPU-C" in order of the highest processing speed.

Figure 5:
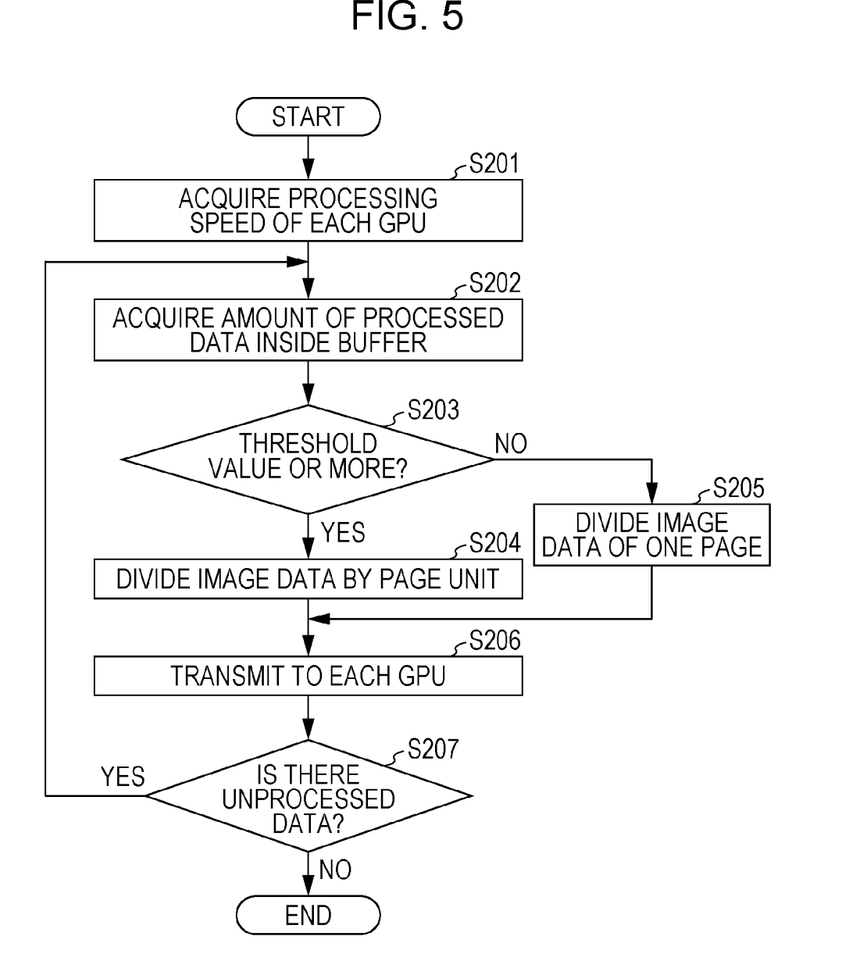
FIG. 5 is a flowchart that shows a summary of image processing in the printing process system.

FIG. 5 is a flowchart that shows a summary of image processing in the printing process system. Additionally, arithmetic processing on image data is executed in parallel by the plurality of GPUs. The process shown in FIG. 5 is a process that the CPU 31 executes in order to optimize the arithmetic processing that each GPU is caused to execute. When the printer 4 is in a state in which it is possible to execute a printing process and a control instruction indicating that image data is to be processed is provided from the user PC 2, the CPU 31 acquires the information related to the processing speed of each GPU, which is installed in the image processing PC 3, from the storage 36 (Step S201). In addition, among the buffer 330, the amount of processed data remaining in the processed data region 332 is acquired (Step S202).

The amount of data inside the processed data region 332 is compared with a predetermined threshold value (Step S203). The processed data that remains in the buffer 330 is printing data that has not yet been provided in printing by the printer 4. Accordingly, in a state in which a given amount of processed data is accumulated inside the buffer 330, even if printing data is created by new image data processing, the printing data is not immediately provided to a printing process. In other words, since there is already printing data to be processed by the printer 4 in the buffer 330, there is some temporal freedom in the image processing PC 3 until new printing data is required.

Therefore, if the amount of data inside the processed data region 332 is the threshold value or more (YES in Step S203), the image data is divided into partial data of page units (Step S204). That is, image data corresponding to an image of one page is processed by a single GPU. The reason for this is that, in the arithmetic processing by the GPU, the processing efficiency is greater if the image data that a single GPU collectively acquires and processes is greater.

Meanwhile, if the amount of data inside the processed data region 332 is less than the threshold value (NO in Step S203), the image data is divided within pages (Step S205). That is, image data corresponding to an image of one page is divided into partial data of a plurality of blocks, and the partial data of each block is respectively processed by a different GPU. In a case in which an image to be printed has a plurality of pages, in particular, intra-page image division is performed for a page to be printed first among the plurality of pages.

Since an aspect that causes a single GPU to process image data corresponding to an image of one page can provide a GPU with a large amount of image data and effectively utilize arithmetic resources, such an aspect is suitable for a case of continuously processing large amounts of image data. Meanwhile, the time required until printing data corresponding to a first page is generated is determined by the processing speed of the GPU that processes the image data of that page. In contrast to this, in an aspect that processes image data corresponding to one page in parallel by using a plurality of GPUs through division, a large number of arithmetic resources are switched on by the processing of the page. Therefore, it is possible to generate printing data of the page more quickly than a case of processing by using a single GPU.

Judging from this, in a case in which the amount of processed data (that is, printing data) inside the buffer 330 is less than the threshold value, at least data corresponding to the first page is processed in parallel by using a plurality of GPUs. As a result of configuring in this manner, it is possible to write printing data corresponding to the page into the buffer 330 at an early stage. For example, if a case in which processing has started from a state in which there is no processed data inside the buffer 330 at all is considered, it is possible to shorten the first print time by causing data corresponding to the first page to be processed by a plurality of GPUs.

In addition, even in a case in which there is some printing data inside the buffer 330, it is possible to suppress the time from a point at which the data is used by the printer 4 until new printing data is provided to a minimum. As a result of this, it is possible to reduce the time corresponding to a standby state in which the printer 4 waits for the generation of printing data.

Meanwhile, in a case in which there is already a sufficient amount of printing data inside the buffer 330, it is more important to process the remaining unprocessed data as quickly as possible and free up the unprocessed data region 331 of the buffer 330 than it is to immediately supply printing data. The reason for this is that as a result of configuring in such a manner, it is possible for the buffer 330 to receive new unprocessed data. Therefore, if the amount of processed data inside the buffer 330 is the threshold value or more, arithmetic processing with a page unit having higher processing efficiency is selected. The processing efficiency by each GPU is improved, and as a result of image data corresponding to a plurality of pages being processed in parallel by a plurality of GPUs, it is possible to decrease the unprocessed data inside the buffer 330 with high efficiency and generate processed data.

Image data (partial data) divided in the above-mentioned manner is respectively transmitted to a corresponding GPU (Step S206). Each GPU processes the provided partial data, and writes processed data to the processed data region 332 of the buffer 330. The CPU 31 returns to Step S202 if there is unprocessed data remaining in the unprocessed data region 331 of the buffer 330, and repeats the above-mentioned process (Step S207).

In this manner, in the printing process system 1, image data division in page units and intra-page image data division is selectively executed in accordance with the amount of processed data accumulated in the processed data region 332 of the buffer 330. Further, the divided partial data is respectively processed in parallel by different GPUs. As a result of configuring in this manner, it is possible to supply printing data to the printer 4 at an early stage and shorten the first print time. In addition, in a case in which printing is continuously performed, as a result of the plurality of GPUs sequentially generating and supplying printing data to the printer 4, a circumstance in which data processing is limited and an interruption in a printing process is caused is avoided.

Figure 6:
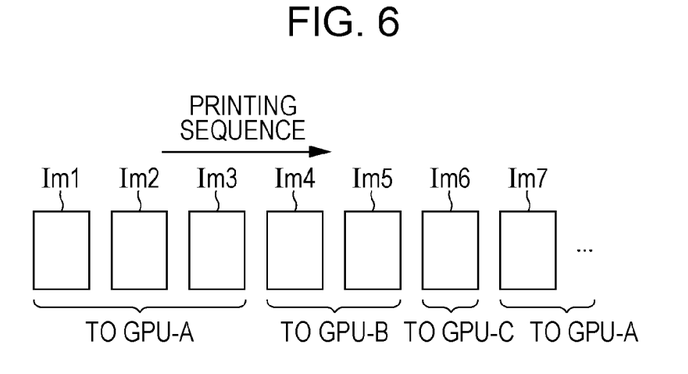
FIG. 6 is a first view that shows an example of the division of image data.
Figure 7:
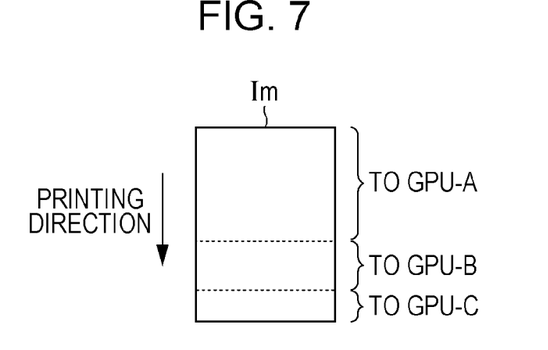
FIG. 7 is a second view that shows an example of the division of image data.

FIGS. 6 and 7 are views that show examples of the division of image data. FIG. 6 shows an example of division in page units, and FIG. 7 shows an example of a case in which image data corresponding to one page is divided. In a case in which image data is divided in page units, a larger amount of image data is allocated to GPUs having higher processing speed. In this case, it is preferable that the number of pages of images allocated to each GPU be proportionate to the processing speeds thereof.

For example, if a ratio of the processing speeds of the three GPUs, that is, the GPU-A, the GPU-B, and the GPU-C is 3:2:1, as shown in FIG. 6, images Im1 to Im3 corresponding to three pages are allocated to GPU-A, which has the highest speed, images Im4 and Im5 corresponding to two pages are allocated to GPU-B, which has the next highest speed, and an image Im6 corresponding to one page is allocated to GPU-C, which has the lowest speed. As a result of configuring in this manner, the timing at which each GPU completes processing of the partial data provided thereto is substantially uniform. Additionally, since a practical speed ratio does not correspond to an integer ratio, the allocation may be determined on the basis of a speed ratio that is rounded as appropriate.

In addition, as shown in FIG. 6, in printing of a plurality of pages, pages that are earlier in a printing sequence are processed by the GPU-A, which has the highest processing speed. When such a configuration is adopted, since the time until processing for data corresponding to the first page stops and the start of printing becomes possible is made as short as possible, a reduction in the first print is achieved. Additionally, it is preferable that at least the first page be processed by the GPU having the highest processing speed, but image data of a second page and up need not necessarily be limited to the format shown in FIG. 6. For example, in a case in which the speed ratio of the GPU-A and the GPU-B is not as large as that mentioned above, there are cases in which the output of printing data of a first page created by the GPU-B is quicker than that of printing data of the second page created by the GPU-A. In such a case, the image data of the second page in the printing sequence may be processed by the GPU-B.

Furthermore, in a case in which there is image data corresponding to unprocessed images Im7, . . . , in a similar manner, the sequential processing thereof is allocated from the GPU-A, which has the highest processing speed. As a result of this, it is also possible to supply printing data to the printer 4 without delay during continuous printing.

Meanwhile, in a case in which image data corresponding to one page is divided, as shown in FIG. 7, among an image Im of the page, the area ratio allocated to each GPU is set to correspond to the processing speed ratio of each GPU. As a result of configuring in this manner, the timing at which each GPU completes processing of the partial data provided thereto is substantially uniform.

In this case, it is also preferable that a beginning portion in the printing direction of the image Im be allocated to the GPU-A, which has the highest processing speed. For example, in a case in which the printer 4 performs printing in band units in the manner of an ink jet printer, unlike a page printer, it is possible to start printing even if image data corresponding to one page is not complete. If the image data of the beginning portion in the printing direction is caused to be processed by the GPU having the highest speed, it is possible to start printing as quickly as possible in such a printer.

In the manner described above, in the above-mentioned embodiment, the printing process system 1 and, in particular, the image processing PC 3 function as the "image processing device" of the invention. In addition, the GPUs 50 and 311 function as the "processors" of the invention, and the CPU 31 functions as the "control portion" of the invention. In addition, among the buffer 330 provided as a partial region of the main body memory 33, the processed data region 332 in particular, functions as the "buffer" of the invention. In addition, the storage 36 functions as the "information retaining portion" of the invention.

In addition, in the above-mentioned embodiment, the GPU cards 5 function as "expansion units" of the invention. In addition, the printer 4 functions as the "printing section" of the invention. In addition, the image data for evaluation used by the process of FIG. 4 is equivalent to the "standard image data".

Additionally, the invention is not necessarily limited to the above-mentioned embodiment, and various alterations can be added to the above-mentioned features within a range that does not depart from the gist of the invention. For example, the image processing PC 3 in the above-mentioned embodiment is equipped with a single GPU 311 in advance, and two GPU cards 5 are further installed. However, as long as a configuration of a device that functions as the "image processing device" referred to in the invention in a state in which a plurality of GPUs are installed is used, the invention can be suitably applied regardless of the manner in which each GPU is installed in the device.

In addition, in the above-mentioned embodiment, all of the GPUs that are installed in the image processing PC 3 are used in image data processing. However, it is not always necessary to operate all of the GPUs. For example, in a case in which the provided image data is of an amount that can be handled by a portion of the GPUs only, processing need not be performed in the other portion of the GPUs. That is, an aspect in which the amount of data allocated to any one of the GPUs is zero is also included in the above-mentioned technical idea.

For example, in a case in which a creation process of printing data is executed from a state in which there is a small amount of printing data accumulated in the processed data region 332 of the buffer 330, it is effective if as many GPUs as possible contribute to processing in order to shorten the first print time. Meanwhile, in a state in which a large amount of printing data is accumulated in the buffer 330, it is not always necessary to speed up data generation. In such a case, it is possible deactivate a portion of the GPUs.

In this case, it is pertinent to configure such that a GPU for which the data allocation amount is set to zero is a GPU having relatively low processing performance compared to other GPUs. Judging from such a viewpoint, for example, a configuration in which the GPU 311 installed in the image processing PC 3 main body is caused to contribute to the creation of printing data only in a state in which the processing load by other GPUs is excessive, is also effective.

In addition, in the above-mentioned embodiment, the respective allocation of image data to the individual GPUs is established. However, an aspect in which the data allocation to a GPU group including several GPUs is determined in accordance with the processing performance of the GPU group may also be used. For example, a group composed of a plurality of GPUs having mutually identical properties can be regarded as a single large GPU having an arithmetic performance obtained by totaling the respective arithmetic performances thereof. Further, in the allocation of image data, it is possible to configure such that partial data to be processed is designated to the overall group rather than to individual GPUs within the group.

In addition, in the allocation of image data illustrated by way of example in FIG. 6, the largest amount of image data and the image data to be provided for printing first is provided to the GPU-A, which has the highest arithmetic processing speed. In this instance, both a technical idea of causing larger amounts of image data to be processed by a GPU having higher arithmetic processing speed and a technical idea of causing image data required first to be processed by a GPU having higher arithmetic processing speed are incorporated. However, the respective technical ideas may be realized independently. For example, a technical idea, which is an aspect that causes a single GPU to process image data one page at a time, and in which the allocation sequence of each page is determined in accordance with the processing performances of the GPUs so that a first page is allocated to GPU-A and a second page is allocated to GPU-B is also included in the technical idea of the invention. This kind of method is particularly effective in a case in which the difference in the performance of each GPU is not as significant as the example mentioned above.

In addition, in the above-mentioned embodiment, the evaluation of the arithmetic processing performance (speed) of each GPU is determined as a result of the image processing PC 3 executing a predetermined process for evaluation. In place of this, an aspect in which, for example, information is acquired from a database in which a score indicating the processing performance of a GPU is recorded, or an aspect in which, for example, the processing performance of each GPU installed in the image processing device is evaluated as a result of a dedicated operator using a dedicated evaluation tool, may also be used.

In addition, in the above-mentioned embodiment, the image processing PC 3 and the printer 4 are configured as separate entities, but may also be integral. That is, a configuration in which the printer has a similar image processing function to that of the above-mentioned image processing PC may also be used. In this case, it is possible to enhance the image processing performance of the printer by mounting a GPU card in the printer.

In addition, for example, the user PC 2 and the image processing PC may be integral. That is, it is also possible to configure such that an image editing application is further installed on the above-mentioned image processing PC, and an original image is created in the image processing PC. In a case in which a user PC is a general-purpose computer apparatus having expansion slots, it is possible to add a function as the image processing PC by further installing GPU cards to the expansion slots. In this case, it is possible to provide the invention as a control program that the computer apparatus executes.

In addition, the above-mentioned embodiment has a configuration in which the image processing device of the invention is realized as a printing process system having a function that converts original image data created by a user PC into printing data that can be used by a printer. However, the data processing that corresponds to the application subject of the invention is not limited to creating printing data in this manner. For example, it is also possible to apply the invention to a process that creates, from original image data, display data for performing image display by using a display device such as a display. High-speed data processing is particularly required in the display of moving images, and the invention can be suitably applied to such as application.

What is claimed is:

1. An image processing device comprising:
 a plurality of processors that execute arithmetic processing on image data;
 storage that retains information related to arithmetic processing speeds of the plurality of processors; and
 a first processor that, among the image data, designates partial data to be processed by the respective processors and causes the plurality of processors to execute arithmetic processing,
 wherein the first processor determines partial data for causing the plurality of processors to process on the basis of the information, and
 wherein in a case in which image data corresponding to images of a plurality of pages is processed, the first processor
 causes the processors to process the partial data divided into page units, and
 causes a processor, among the processors, having a highest arithmetic processing speed to process partial data that corresponds to a page to be output first among the plurality of pages.

2. The image processing device according to claim 1, wherein the first processor causes a processor having higher arithmetic processing speed to process a larger processing amount of partial data.

3. The image processing device according to claim 1, further comprising:
 a buffer that accumulates processed image data,
 wherein the first processor causes the processors to process partial data in which image data that corresponds to a single image is divided when an amount of data accumulated in the buffer is less than a predetermined value.

4. The image processing device according to claim 3, wherein the first processor causes the processors to process partial data divided into page units when an amount of data inside the buffer exceeds the predetermined value.

5. The image processing device according to claim 1, wherein the storage retains information based on a result of the processors processing predetermined standard image data in advance.

6. The image processing device according to claim 1, wherein at least one of the processors is provided in an expansion unit that is attachable and detachable to and from a computer apparatus of the first processor.

7. The image processing device according to claim 6, wherein the first processor rewrites the information that the storage retains in accordance with a mounting state of the expansion unit.

8. The image processing device according to claim 1, further comprising:
 a printer that performs printing on the basis of the image data processed by the plurality of processors.

9. The image processing device according to claim 1, wherein:
 the plurality of processors include a graphics processing unit (GPU) group comprising a plurality of GPUs having mutually identical properties, and
 the first processor is configured to determine allocation of the image data to the GPU group in accordance with processing performance of the GPU group.

10. An image processing method that processes image data by using a plurality of processors, the method comprising:
 when information related to arithmetic processing speeds of the plurality of processors is calculated in advance, causing a first processor to determine, among the image data, partial data for causing the plurality of processors to process on the basis of the information;

causing the first processor to transmit the partial data that corresponds to the plurality of processors to the processors;

causing the plurality of processors to execute arithmetic processing based on the partial data received; and in a case in which image data corresponding to images of a plurality of pages is processed,     causing the processors to process the partial data divided into page units, and     causing a processor, among the processors, having a highest arithmetic processing speed to process partial data that corresponds to a page to be output first among the plurality of pages.

11. A non-transitory computer-readable recording medium on which a control program is recorded for causing first processor of a computer apparatus provided with a plurality of processors that process image data, to execute:

calculating information related to arithmetic processing speeds of the plurality of processors;

determining, among the image data, partial data for causing the plurality of processors to process on the basis of the information;

transmitting the partial data that corresponds to the plurality of processors to the processors; and in a case in which image data corresponding to images of a plurality of pages is processed,     causing the processors to process the partial data divided into page units, and     causing a processor, among the processors, having a highest arithmetic processing speed to process partial data that corresponds to a page to be output first among the plurality of pages.

* * * * *